July 4, 1944.   F. F. RUAU   2,353,085
GAUGING OR SORTING MACHINE
Filed Dec. 14, 1942   2 Sheets-Sheet 1

Inventor
Felix F. Ruau
By Watson, Cole, Grindle & Watson,
Attorneys.

July 4, 1944.   F. F. RUAU   2,353,085
GAUGING OR SORTING MACHINE
Filed Dec. 14, 1942   2 Sheets-Sheet 2
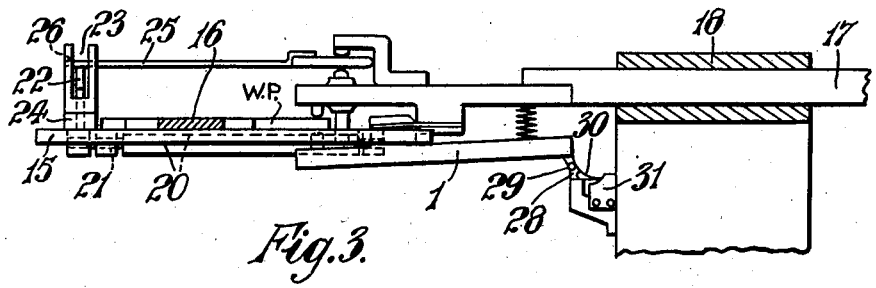
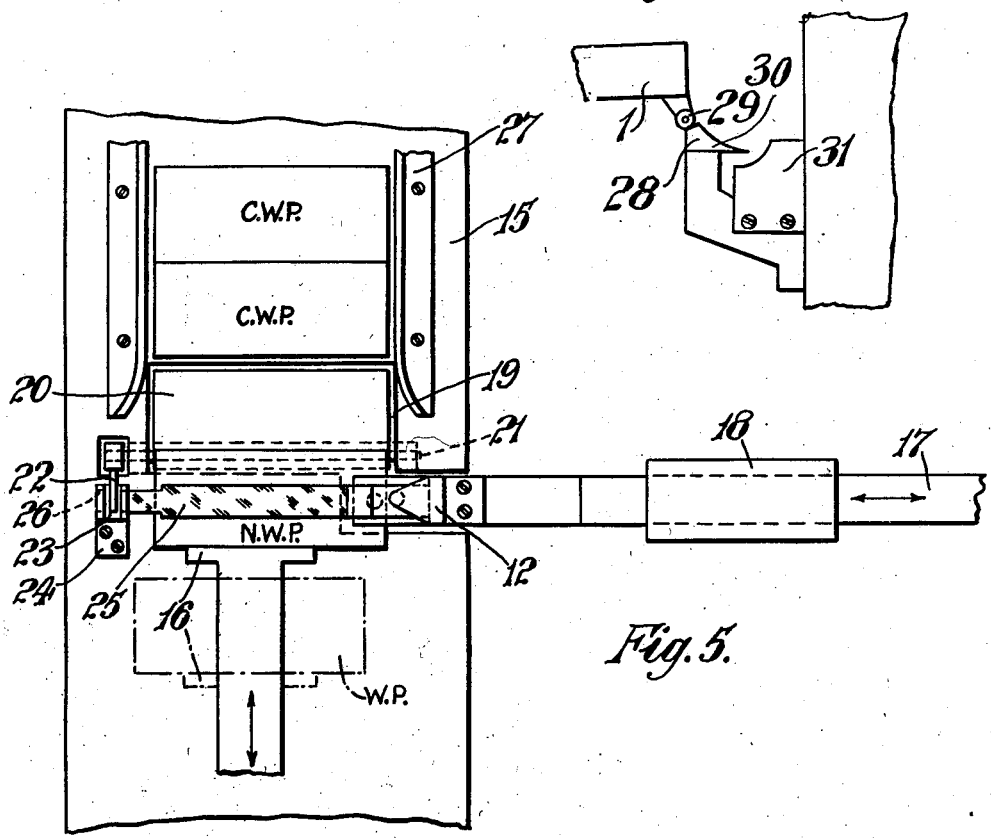

Patented July 4, 1944

2,353,085

UNITED STATES PATENT OFFICE 2,353,085

GAUGING OR SORTING MACHINE

Félix Frédéric Ruau, Deptford, London, England

Application December 14, 1942, Serial No. 469,033
In Great Britain December 3, 1941

12 Claims. (Cl. 209—89)

This invention concerns improvements in or relating to gauging devices, for example for use in gauging or sorting machines.

In one form of the invention an article to be gauged (e. g. for thickness) is placed between a pair of gauging jaws and according to the thickness of said article a piece of material (e. g. a slip gauge) between another pair of jaws is either gripped or remains free. In this way an article can be quickly gauged within any desired degree of tolerance, which is fixed by the dimension of said slip gauge.

In another form of the invention the gauging device set forth in the preceding paragraph forms a part of a gauging or sorting machine and means to operate a signal or to direct a gauged article along any particular path may be controlled by a device operatively connected to (for example) the slip gauge so that, for example, when the gauge is gripped a certain operation ensues and when the gauge is free, either another operation takes place or the first operation does not occur, depending on the design of the machine.

Again according to the present invention there is provided a gauging device comprising two pairs of gauging jaws, each pair being adapted to receive a piece of rigid material (for example a slip gauge and a workpiece respectively) one jaw of the first pair being operatively connected to one jaw of the second pair for movement therewith, the displacement of the other jaw of one pair from its co-operating jaw being determined by the dimension of the piece of material between the other pair of jaws, a predetermined minimum value of said displacement being, however, set by a fixed stop whereby the other piece of material is free to move between its jaws or is gripped between them according to the extent of said displacement.

The operatively connected jaws may be mounted on members hinged together for mutual movement and the stop may comprise co-operating abutments on said hinged members.

One other jaw may be constituted by a piece slidable in one of said members, said sliding piece also constituting one of said abutments. Alternatively both other jaws may be formed by the opposite ends of a piece slidable in one of said members. The device may be coupled by any suitable means (e. g. electrical means) to sorting or signalling devices so that said devices may be caused to operate according to whether the slip gauge (or alternatively the workpiece) is gripped between a pair of gauging jaws or remains free.

Other objects and features of novelty will be apparent from the following specification when read in connection with the accompanying drawings in which certain embodiments of the invention are illustrated by way of example.

In the drawings,

Figures 3 and 4 show diagrammatically a method of operation of a sorting machine embodying the device, the views representing the parts in two different positions.

Figure 5 is a plan of Figure 4.

Figure 6 is an enlarged view of a portion of the structure shown in Figure 3.

Figure 1:
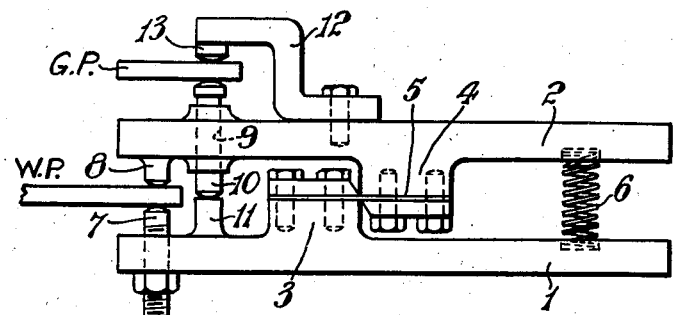
Figure 1 shows one form of gauging device constructed according to the invention.

Referring to the drawings: in Figure 1 the gauging device consists of a pair of substantially straight levers 1 and 2, each provided with a lug or block 3 and 4 respectively, about midway of its length and so arranged that the levers may be hinged together by a hinge attached to said lugs. Preferably the hinge consists of a flat spring 5 which is clamped, as shown, to each of the lugs so that the levers move relatively to one another by flexure of the spring. At one end the levers are urged apart by a compression spring 6, and at the other end each lever is provided with a gauging member or pin, the pins 7 and 8 respectively being in alignment to constitute a gauging jaw so that the thickness of a workpiece may be determined by placing it between the two gauging pins which are then forced towards one another by the compression spring. The lever 2 is also provided with a hole 9 at a position between the gauge pin 8 and the hinge and so arranged that the axis of a pin 10 slidable in said hole is parallel to the axis of the said gauge pin. The other lever 1 is provided with a small anvil or registering surface 11 which is in alignment with the slidable pin. The gauge pin 7 in this lever may be adjustable, for example by being formed as a screw.

The lever 2 in which the slidable pin is mounted is further provided with a bracket or lug 12 having a gauge pin 13 fixed therein and so arranged that this pin is axially in alignment with the slidable pin 10 and thus a further gauging jaw is formed, by said fixed pin and one end of the slidable pin, between which a gauge-piece G. P. (e. g. a slip gauge) may be positioned.

The device described above is intended for determining whether an article is of the correct thickness or less than said thickness. The operation is performed by placing the article W. P. between the pair of gauging jaws 7 and 8 and at the same time placing a gauge-piece G. P. or the like between the other pair of gauging jaws. The workpiece is gripped between its pair of gauging jaws and one end of the slidable pin contacts by gravity, or if desired by the pressure of a light spring, with the anvil. Thus the distance of the gauge pin 13 on the bracket 12 from the other end of the sliding pin 10 is determined by the thickness of the workpiece. The slip gauge chosen is of such dimensions that if the workpiece is of the correct thickness the slip gauge can just move freely between its pair of gauge pins because it will be observed that if the gauge-piece is removed the distance between the pin 13 and the pin 10 depends entirely on the thickness of the workpiece. Such freedom of movement of the gauge-piece can be utilised to control a sorting or registering apparatus. If, on the other hand, the workpiece is undersize, the pins 7 and 8 are closer and thus the pin 10 protrudes slightly more above the lever 2 and the slip gauge will be gripped between its pair of gauge pins and cannot be moved. Thus the gripping of the slip gauge may be utilised, as will be described later, to cause the workpiece being tested to be rejected by the sorting machine as undersize.

While the drawings show the gauge-piece and workpiece of equal thickness, this is not essential, the only thing necessary being that if the work is correct the gauge will be free, and if undersize the gauge will be gripped.

Figure 2:
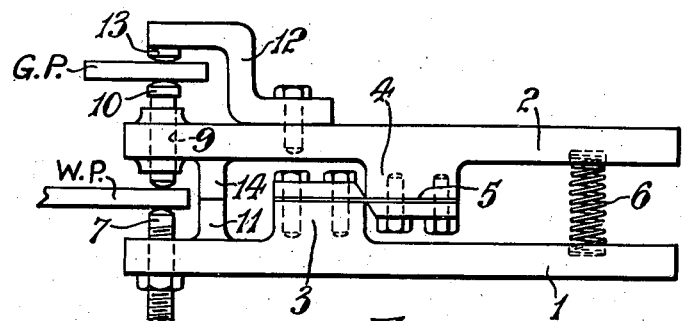
Figure 2 shows another form of gauging device constructed according to the invention.

In the alternative construction shown in Figure 2, the arrangement of the levers is generally similar to that above described, and the parts bear similar references, but the anvil 11 previously mentioned co-operates with a similar anvil 14 on the lever 2 which lever, instead of being provided with a gauge pin 8 as in the previous example, is only furnished with the hole 9 through which the sliding pin 10 passes, the pin being in the position formerly occupied by the gauge pin 8. Thus in this example the four gauging points are all in substantially axial alignment. The workpiece and slip gauge are placed in the device as before and if the workpiece is correct in size the levers move towards one another until the anvils touch. In this way the upper end of the sliding pin is brought to a certain position depending on the thickness of the workpiece, while at the same time the gauge pin in the bracket which co-operates with one end of the sliding pin is also brought to a certain position by the meeting of the anvils. The dimensions of the parts are so arranged that in this event the slip gauge may move freely between the sliding pin and the gauge pin on the bracket, while if the workpiece is oversize there will be a gap between the ends of the anvils, and the upper end of the sliding pin is thus brought to a position nearer to the gauge pin in the bracket so that the gap between these two gauge pins is narrower than in the previous case. Thus the slip gauge is firmly gripped between the two gauge pins and its movements are thereby restricted, and thus the freedom or fixing of the slip gauge may be utilised to control sorting apparatus.

Figure 4:
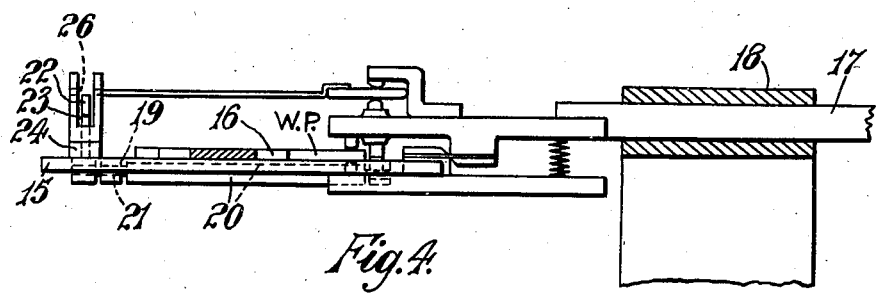

In Figures 3, 4 and 5 the gauging device is shown to a smaller scale and in less detail, fitted to a sorting machine comprising a table 15 over which workpieces are moved one at a time from the position shown in chain lines in Figure 5 and marked W. P. to the gauging position by any suitable conveyor; illustrated as a simple reciprocating pusher 16. The workpieces may of course be piled in a magazine from the bottom of which they are removed one at a time by the pusher. The gauging device is also mounted for reciprocation at right angles to the pusher movement and for this purpose is fixed to a bar 17 slidable in a guide 18 and reciprocated by any suitable device (not shown). The table 15 has an aperture 19 in it through which certain workpieces, in this example those rejected by the gauging device, can pass. The aperture may be closed to prevent this by a trap piece 20 pivoted at 21. The trap is balanced so that it tends to remain closed as shown in Figure 5 and is normally held by a catch. The catch consists of an arm 22 attached to the trap and movable, when the trap pivots, in a slot 23 formed in a bracket 24. A strip 25 attached to the gauge piece G. P., and which is slidable in a transverse slot 26 in the bracket, prevents this movement when the gauge piece is not moved during a gauging operation, as explained later.

The reciprocating members 16 and 17 are mechanically coupled and work in timed relationship. As the new workpiece marked N. W. P. is brought to the gauging position by the pusher 16, that is as shown in Figure 5, the pusher remains still and the member 17 advances to the left until the gauge pins, which are opened as described below, pass beyond the edges of the gauge piece and workpiece (Figure 3) so that the said pieces will be embraced thereby. The pins then close-in and if both pieces are gripped (i. e. if the workpiece is undersize as is deemed to be the case in this particular operation) the return movement of the member 17 to the right will cause both the workpiece and the gauge to move to the right to the position shown in Figures 4 and 5. Previously the new workpiece would have been in alignment with that marked W. P. and the gauge and its strip 25 further to the left, so that the strip 25 extended through the bracket 24, see Figure 3. As the part 17 reaches the extreme right hand position the pressure of the gauge jaws is relaxed as described below and thus the workpiece is freed. The pusher 16 then moves forwards again and urges the workpiece N. W. P. towards the position occupied by the lowest workpiece marked C. W. P. But as the strip 25 is now far enough to the right to permit the arm 22 to move, the trap opens under the weight of the workpiece N. W. P. and the latter falls through the aperture 19 in the table into a box or the like.

It will be seen that in all cases the workpieces are moved to the right with the gauging device and thus are brought slightly out of alignment with their original placing, correct workpieces C. W. P. passing along the guides 27 on continued operation of the machine. The pusher 16 then returns to the lowest position shown in chain lines in Figure 5 and the whole operation is repeated and after the pusher feeds a fresh workpiece to the gauging position the member 17 moves inwards once more for the gauging operation on the fresh workpiece, and during this movement carries back the gauge piece and the strip 25 (when as in this particular operation these have been moved to the right) to the original position (Figure 3) by pressing against the end of the gauge-piece by the bracket 12 and thus the trap, which swings up as the rejected workpiece falls, is once more held in the closed position.

The levers 1 and 2 are caused to open wide enough to pass easily over the gauge-piece and workpiece as the part 17 moves to the left by a cam 28 over which a roller 29 attached to the lever 1 rides as the member 17 moves to the left. The gauge pins are rounded and will thus move over the upper surfaces of the workpiece and gauge-piece, which are substantially in alignment therewith, while the gauge pin 7 is sufficiently far below the undersurface of the workpiece to pass by and owing to the opening of the jaws the pin 10 drops down until it contacts with the anvil 11, so that the upper surface of the pin is below the undersurface of the gauge-piece. The parts are then in the position shown in Figure 3, and immediately after this the roller 29 drops sharply down the front of the cam 28 and as the part 17 moves in the reverse direction the roller runs along the bottom of the cam 28 so that the levers 1 and 2 are then parallel, that is, as shown in Figure 4 and the gauge-piece and workpiece are gripped. The cam 28 is provided with a hinged part 30 and a further cam 31 is also provided. As the roller 29 comes against the face of the cam 31 it runs up the cam and thus lifts the hinged part 30 of the other cam which then drops and prevents the roller from moving along the underneath of the cam 28, when a further reversal of the movement takes place. The member 17 has practically finished its stroke in the right hand direction at the instant when the roller lifts the hinged part of the cam 28, and as at this time the grip on the workpiece and the gauge-piece becomes relaxed as previously mentioned the workpiece remains still substantially in alignment with the guides 27.

What I claim as my invention and desire to secure by Letters Patent is:

1. A gauging device comprising two pairs of gauging jaws, each pair being adapted to receive a piece of rigid material, one jaw of the first pair being operatively connected to one jaw of the second pair for movement therewith, the displacement of the other jaw of one pair from its cooperating jaw being determined by the dimension of the piece of material between the other pair of jaws, and fixed stop means for setting a predetermined minimum value of said displacement, whereby the other piece of material is free to move bewteen its jaws or is gripped between them according to the extent of said displacement, two members carrying the operatively connected jaws and being hinged together for mutual movement, and cooperating abutments carried by and rigid with said hinged members respectively for comprising said stop means.

2. A gauging device as claimed in claim 1, wherein one jaw of each pair is contituted by the oppositie ends of a piece slidable in one of said members.

3. A gauging device comprising a movable member carrying a pair of spaced jaws between which an article to be gauged is placed, a second pair of spaced jaws between which a slip gauge or the like is placed, means operatively connecting the two pairs of jaws so that when the article receiving jaws close upon an article and are not stopped by said article itself when they are a predetermined distance apart representing the desired thickness of said article, the gauge receiving jaws grip the slip gauge firmly between them, means for moving the member when both the article being gauged and the slip gauge are between the respective pairs of jaws, whereby movement of the gripped slip gauge along with the member will result when the thickness of the article departs from the predetermined standard, means for moving successive articles to be tested into and out of the reach of said jaws and along a delivery path, means for diverting an article from said delivery path, and means operatively connected between said last named means and said slip gauge for bringing said last named means into operation to divert an off-sized article upon movement of the slip gauge when gripped as described.

4. In a testing apparatus of the class described, a support for a plurality of articles to be successively gauged, a gauging device adapted to be operated intermittently to gauge said article at a point upon said support, means for feeding said articles successively along said support toward said point, means for guiding certain of said articles along a delivery path away from said point, means diverting certain other of said articles from said delivery path, said delivery path being slightly offset from the direction of feeding, a slip gauge disposed adjacent said point, spaced from any article at said point to be tested, and mounted for reciprocatory movement transversely of the path of movement of said articles, means operatively connecting said slip gauge to said diverting means to trip the latter when said slip gauge is moved, said gauging device comprising two pairs of jaws, one pair adapted to close upon the article at the test point, and the other pair upon the slip gauge, and means operatively connecting said pairs of jaws and so constructed and arranged as to cause the second named pair of jaws to grip the slip gauge firmly when the other pair close upon an article of a thickness different from the predetermined standard, means for intermittently moving said gauge device toward the path of the articles being tested to receive the article and gauge between the respective pairs of jaws, and from said path to move said article transversely, and also move said slip gauge to actuate the diverting means in the event the article is of an off size.

5. In a testing apparatus of the class described, a support for a plurality of articles to be successively gauged, a gauging device adapted to be operated intermittently to gauge said article at a point upon said support, means for feeding said articles successively along said support toward said point, means for guiding certain of said articles along a delivery path away from said point, a trap in said support through which certain other of said articles may fall instead of pursuing said delivery path, said trap and said delivery path being slightly offset from the direction of feeding, a slip gauge disposed adjacent said point, spaced above any article at said point to be tested, and mounted for reciprocatory movement transversely of the path of movement of said articles, means operatively connecting said slip gauge to said trap to trip the latter when said slip gauge is moved, said gauging device comprising two pairs of jaws, one pair adapted to close upon the article at the test point, and the other pair to simultaneously close upon the slip gauge, and means operatively connecting said pairs of jaws and so constructed and arranged as to cause the second named pair of jaws to grip the slip gauge firmly when the other pair close upon an article of a thickness different from the predetermined standard, means for intermittently moving said gauge device toward the path of the articles being tested to receive the article and gauge between the respective pairs of jaws, and from said path to move said article transversely, and also move said slip gauge to trip the trap in the event the article is of an off size.

6. A gauging device comprising two pairs of gauging jaws, each pair being adapted to receive a piece of rigid material, one jaw of the first pair being operatively connected to one jaw of the second pair for movement therewith, the displacement of the other jaw of one pair from its cooperating jaw being determined by the dimension of the piece of material between the other pair of jaws, and stop means for setting a predetermined minimum value of said displacement, whereby the other piece of material is free to move between its jaws or is gripped between them according to the extent of said displacement, two members carrying the operatively connected jaws and being hinged together for mutual movement, one of the jaws being constituted by an element slidable in one of said members, said sliding element also constituting one of said stop means.

7. A gauging device comprising a pair of members hinged together and provided at adjacent ends which are on the same side of the hinge point with two pairs of gauging jaws, each pair adapted to receive a piece of rigid material, one jaw of each pair being respectively rigid with one of said members, and a floating element guided for sliding movement relative to one of said members and providing at least one of the remaining jaws of the two pairs.

8. A device according to claim 7, in which one end of the floating element constitutes a jaw cooperating with one of said first named jaws of the pairs, which is rigid with one of said members and the other end of said floating member comprising an abutment which bears against a portion of the other of said members in operation.

9. A device according to claim 7 in which both ends of the floating element constitute jaws which cooperate respectively with the first named jaws of the pairs carried by the members.

10. A gauging device comprising a pair of members hinged together and provided at adjacent ends which are on the same side of the hinge point with two pairs of gauge jaws, said pairs of jaws adapted to receive within their respective openings a test piece and a gauge piece, the openings between the jaws of said pairs being displaced from each other in the direction of opening and closing movement, one jaw of the first pair being rigidly connected with one jaw of the second pair for unitary movement, and cooperating stop means operatively supported by the two hinged members and adapted to abut each other under certain conditions of operation for setting an optimum standard thickness of the test piece corresponding to the gauge piece and causing the gauge piece to be gripped by its jaws upon departure from the predetermined standard in one direction.

11. A gauging device comprising a pair of members hinged together and provided at adjacent ends which are on the same side of the hinge point with two pairs of gauge jaws, said pairs of jaws adapted to receive within their respective openings a test piece and a gauge piece, the openings between the jaws of said pairs being displaced from each other in the direction of opening and closing movement, one jaw of the first pair being rigidly connected with one jaw of the second pair for unitary movement, means operatively connecting said jaws so that when the test piece receiving jaws approach each other, the gauge piece receiving jaws also approach each other, and cooperating stop means operatively supported by the two hinged members and adapted to abut each other under certain conditions of operation for setting a minimum standard thickness of the test piece corresponding to the gauge piece and causing the gauge piece to be gripped by its jaws when the test piece is of a lesser thickness than the gauge piece.

12. A gauging device comprising a pair of members hinged together and provided at adjacent ends which are on the same side of the hinge point with two pairs of gauge jaws, said pairs of jaws adapted to receive within their respective openings a test piece and a gauge piece, the openings between the jaws of said pairs being displaced from each other in the direction of opening and closing movement, one jaw of the first pair being rigidly connected with one jaw of the second pair for unitary movement, means operatively connecting said jaws so that when the test piece receiving jaws approach each other, the gauge piece receiving jaws move apart, and cooperating stop means operatively supported by the two hinged members and adapted to abut each other under certain conditions of operation for setting a maximum standard thickness of the test piece corresponding to the gauge piece and causing the gauge piece to be gripped by its jaws when the test piece is of a greater thickness than the gauge piece.

FÉLIX FRÉDÉRIC RUAU.